(12) United States Patent
Szentimery

(10) Patent No.: US 6,305,896 B1
(45) Date of Patent: Oct. 23, 2001

(54) VEHICLE DISCHARGE SYSTEM

(76) Inventor: Mark D. Szentimery, RR 1, Branchton, Ontario (CA), N0B 1L0

(*) Notice: Subject to any disclaimer, the term of this patent is extended or adjusted under 35 U.S.C. 154(b) by 0 days.

(21) Appl. No.: 09/329,198

(22) Filed: Jun. 10, 1999

(51) Int. Cl.[7] .................................................. B65G 15/14
(52) U.S. Cl. ..................... 414/502; 198/605; 198/626.5; 414/528; 239/672
(58) Field of Search ..................................... 198/837, 604, 198/605, 626.1, 626.5, 836.2; 414/523, 526, 528, 502, 503, 504, 505, 489, 327; 239/657, 663, 664, 672, 675, 676

(56) References Cited

U.S. PATENT DOCUMENTS

| | | |
|---|---|---|
| 3,653,951 | 4/1972 | Maldehis et al. . |
| 3,760,933 | 9/1973 | Maldehis et al. . |
| 3,900,392 * | 8/1975 | Speno et al. .................... 414/502 X |
| 4,081,074 | 3/1978 | Stone . |
| 4,312,677 * | 1/1982 | Tilby et al. ...................... 198/605 X |
| 4,627,702 | 12/1986 | Anderson . |
| 4,817,781 * | 4/1989 | Folk .................................. 198/626.5 |
| 5,042,240 * | 8/1991 | Rocca et al. ..................... 414/505 X |
| 5,286,158 | 2/1994 | Zimmerman . |

FOREIGN PATENT DOCUMENTS

| | | | |
|---|---|---|---|
| 305298 * | 4/1955 | (CH) | .................................. 414/503 |
| 2216094 * | 10/1989 | (GB) | .................................. 414/505 |

* cited by examiner

Primary Examiner—Frank E. Werner
(74) Attorney, Agent, or Firm—R. Craig Armstrong

(57) ABSTRACT

A system for discharging material, having a material holding container, a first material transport device, to transport material from the material holding container, a second material transport device, to deliver material from the first material transport device to a desired location remote from the vehicle and a material hold-down device arranged on the second material transport device. The material hold-down device is movable between a raised position and a lowered position, and holds material securely on the second material transport device until the material has been accelerated up to the desired travel speed. The material hold-down device has a first wheel shaft with a first wheel and a second wheel, a second wheel shaft with a third wheel and an endless belt running from the first wheel shaft to the second wheel shaft and resting upon the first wheel, the second wheel and the third wheel. The first and second wheel shafts are connected by a frame device. The third wheel is arranged substantially centred on the second wheel shaft and the first wheel and the second wheel are substantially equidistant from the centre of the first wheel shaft. The endless belt is self-tracking, i.e. it stays centred on the three wheels even at higher speeds.

6 Claims, 10 Drawing Sheets

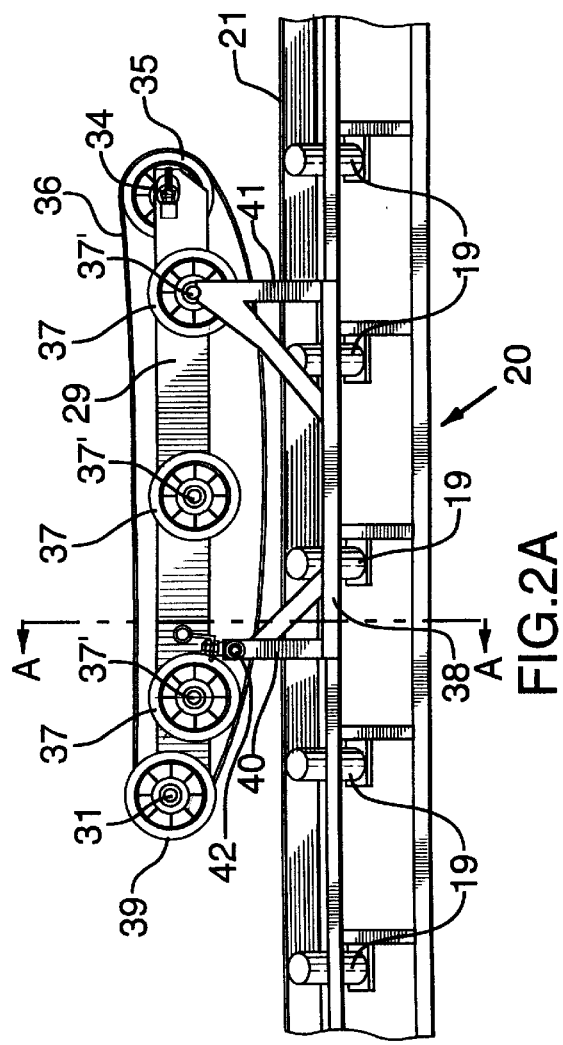
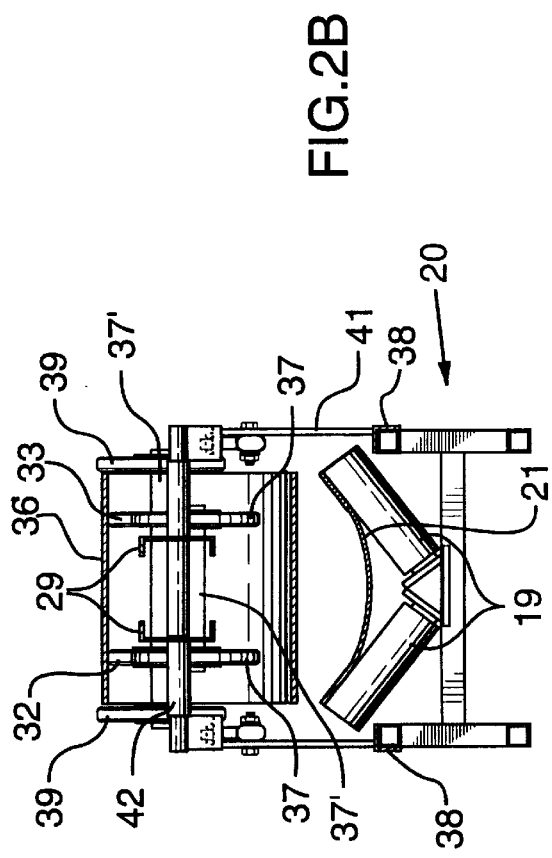
FIG.2A
FIG.2B

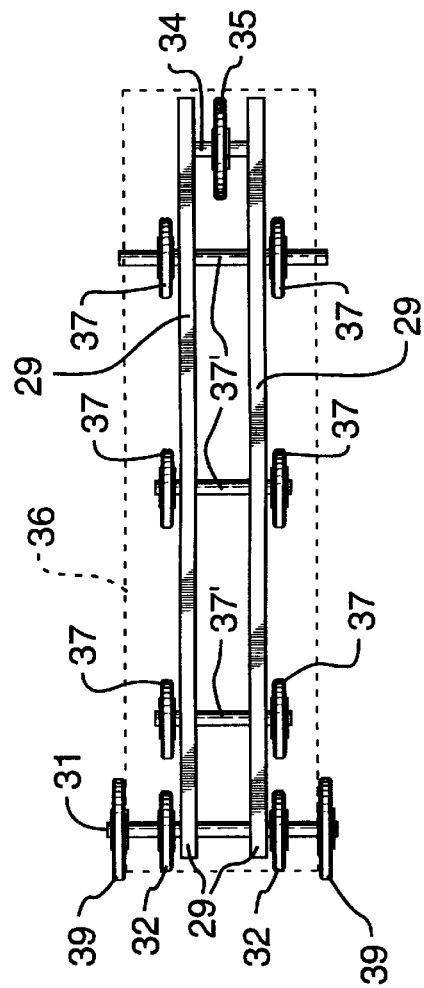
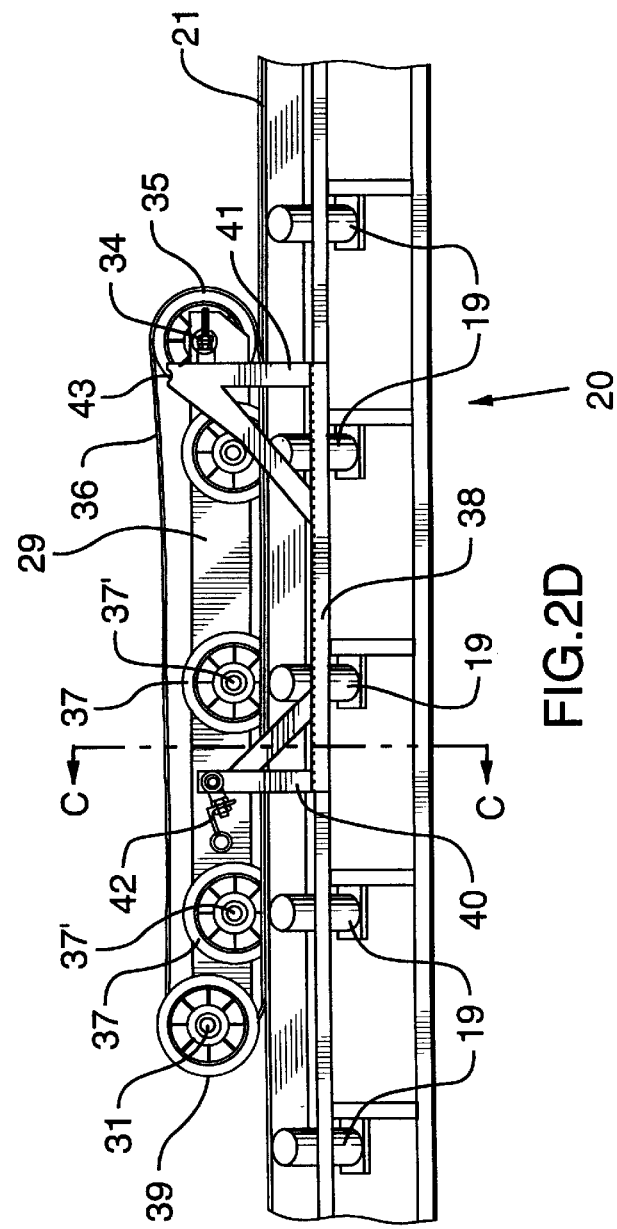

VEHICLE DISCHARGE SYSTEM

BACKGROUND OF THE INVENTION

1. Field of the Invention

This invention relates to a system for discharging material from a vehicle and, more particularly, to a conveyor arrangement mounted to a vehicle, such as a truck. The vehicle has a material holding container connected to one or more hoppers leading to an endless belt transporter arrangement situated directly underneath the material holding container.

2. Description of the Prior Art

The material for discharge is any divided material such as gravel or sand. It is desirable to deposit the material at a location remote from the immediate area around the vehicle, thus an apparatus as disclosed in U.S. Pat. No. 5,286,158 has been developed. The discharged material is flung at high speed from the apparatus, directed towards the deposit area. The discharge apparatus includes a high speed endless belt having a lower middle cross-section and higher sides, to keep the material centred on the belt. Above the belt, a constraining member which deflects material to be distributed onto the central portion of the belt and also retains the material on this central portion. The constraining member is basically a deflector shield to prevent material from leaving the belt before the material reaches the discharge opening. The constant barrage of loose material on the constraining member creates an unnecessary high noise level at the same time as the wear on the constraining member is unnecessary high. At the same time, the material is accelerated up to discharge speed only by the gravitational and frictional forces working on and between the first belt and the material.

Today, the most commonly used vehicle has a material holding container mounted on the vehicle, a plurality of material feeding means arranged at a lower part of the container, and a first material transport means arranged to transport material from the feeding means. The material transport means is usually a low speed first endless belt running over a plurality of first rollers. The first endless belt has a first end, located adjacent the material holding container, and a second end, located away from the material holding container. A second material transport means is arranged to cooperate with the first material transport means and this second material transport means is usually a second endless belt running over a plurality of second rollers. The second endless belt has a third end, located adjacent the second end of the first endless belt, and a fourth end, pointing in the direction of the desired material discharge. The second material transport means further has a material hold-down means arranged above the material transport means and in frictional contact with the second endless belt. The material hold-down means is usually a third endless belt. This third endless belt is driven by frictional forces between itself and the second endless belt, and usually has a forward roller, a rearward roller and downwardly arranged pulley wheels to keep the third endless belt stretched along a distance of the second endless belt, so that the material is securely held between the two belts to prevent any material from leaving the second endless belt before the material has reached the desired discharge speed. Large tracking problems are often associated with this construction of the third endless belt, i.e. the belt does not stay centred on the rollers, but tries to leave the rollers in either sideways direction. To combat this, end wheels or flanged ends of the rollers have been used, which forcibly constrain the belt to remain on the rollers. This increases the power required to propel the second endless belt because of the increased power lost to frictional forces, and also increases the wear and tear on the third endless belt.

There is a need for an improved apparatus which would provide for less required driving power for the second endless belt and lower wear on the third endless belt.

SUMMARY OF THE INVENTION

In view of the preceding, it is an object of the invention to provide an improved apparatus for discharge of material from a vehicle.

To provide less required driving power to the second endless belt and to lower the wear on the third endless belt, the third endless belt has a rear roller in the form of a narrow wheel, and a front roller in the shape of a roll or two separate wheels located one each towards the respective edge of the belt. With this arrangement, the third endless belt is self tracking in its rollers, when it is propelled by the second endless belt.

Thus, according to the invention, a system for discharging material from a vehicle comprises a material holding container mounted on the vehicle, a plurality of material feeding means, such as hoppers, arranged at a lower part of the container, and a first material transport means arranged to transport material from the feeding means. The first material transport means preferably comprises a low speed first endless belt running over a plurality of first rollers, the first endless belt having a first end, located adjacent the material holding container, and a second end, located away from the material holding container.

A second material transport means is arranged to cooperate with the first material transport means, the second material transport means preferably comprising a second endless belt running over a plurality of second rollers. The second endless belt has a third end, located adjacent the second end of the first endless belt, and a fourth end, pointing in the direction of the desired material discharge. The second material transport means further comprises a material hold-down means arranged above the second endless belt and engageable in frictional contact with the second endless belt. The material hold-down means comprises a third endless belt, a first wheel shaft with a first wheel and a second wheel, a second wheel shaft with a third wheel and a second endless belt running from the first wheel shaft to the second wheel shaft and resting upon the first wheel, the second wheel and the third wheel. The first and second wheel shafts are connected by a frame means. The third wheel is arranged substantially centred on the second wheel shaft and the first wheel and the second wheel are substantially equidistant from the centre of the first wheel shaft. The third endless belt is propelled by frictional forces between the second endless belt and the third endless belt. The arrangement with three wheels holding the respective ends of the third endless belt improves the tracking of the third endless belt. The third endless belt is thus self-tracking on the three wheels, even if the first and second wheel shafts are not longitudinally parallel to each other.

The material emptied from the material holding container is propelled to a low speed on the first endless belt and then transferred to the second endless belt, where the material is accelerated to a high speed. To hold the material securely on the second endless belt, until it reaches the desired velocity, the material hold-down means presses the material onto the second endless belt. This prevents the material from being scattered from the second endless belt prematurely, thus improving both the efficiency of the system as well as the environmental safety of the operator of the system and anyone in the vicinity of the system. The material being discharged from the second endless belt can be accurately placed at the desired remote location from the system by throwing the material a certain distance from the discharge end of the second endless belt.

Further features of the invention will be described or will become apparent in the following detailed description.

BRIEF DESCRIPTION OF THE DRAWINGS

The invention will now be described in detail with reference to the accompanying drawings, in which:

FIG. 2A is a side view of the second material transport means and the material hold down means according to the invention, showing the hold-down means in its raised position, FIG. 2B is a sectional front view of the system according to FIG. 2A, along line A—A, FIG. 2C is a view from above of the frame means and wheels of the material hold down means according to FIGS. 2A and 2B, FIG. 2D is a side view of the second material transport means and the material hold down means according to the invention, showing the material hold-down means in its lowered position.

DETAILED DESCRIPTION OF THE PREFERRED EMBODIMENTS

Figure 1A:
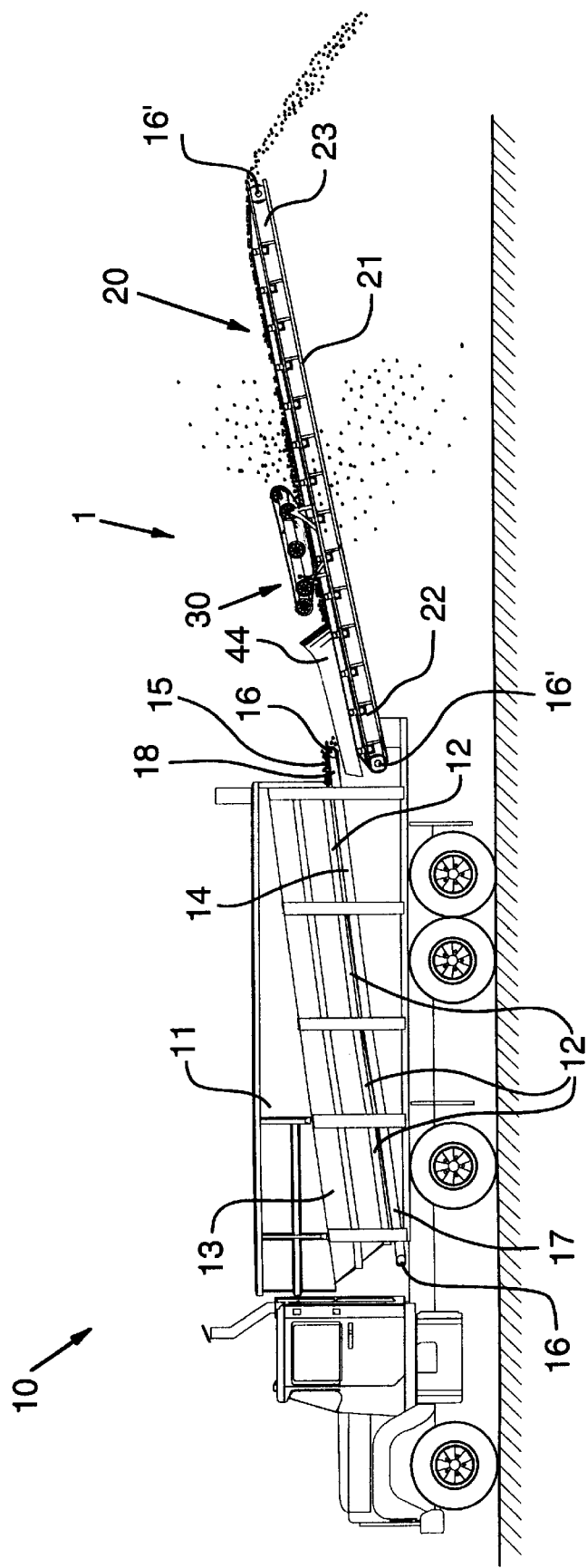
FIG. 1A is a side view of a vehicle equipped with a system according to one embodiment of the invention, showing the hold-down means in its raised position.
Figure 1B:
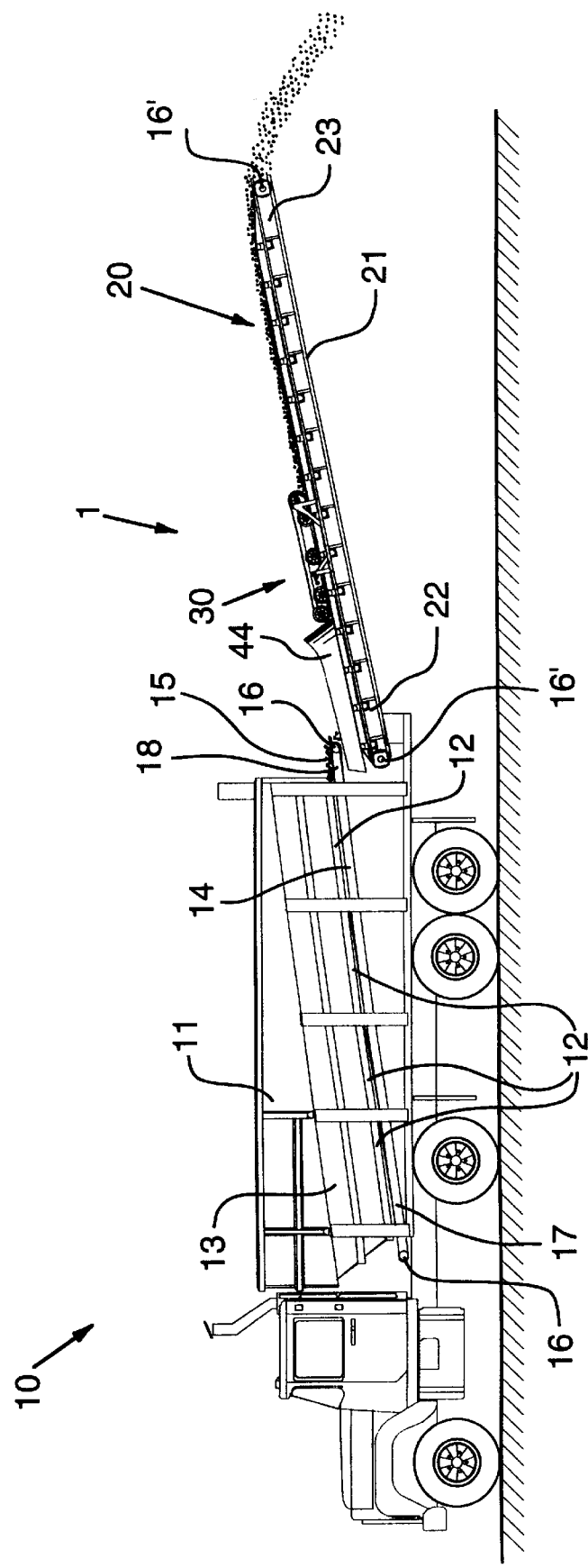
FIG. 1B is a side view of a vehicle equipped with a system according to one embodiment of the invention, showing the hold-down means in its lowered position.
Figure 1C:
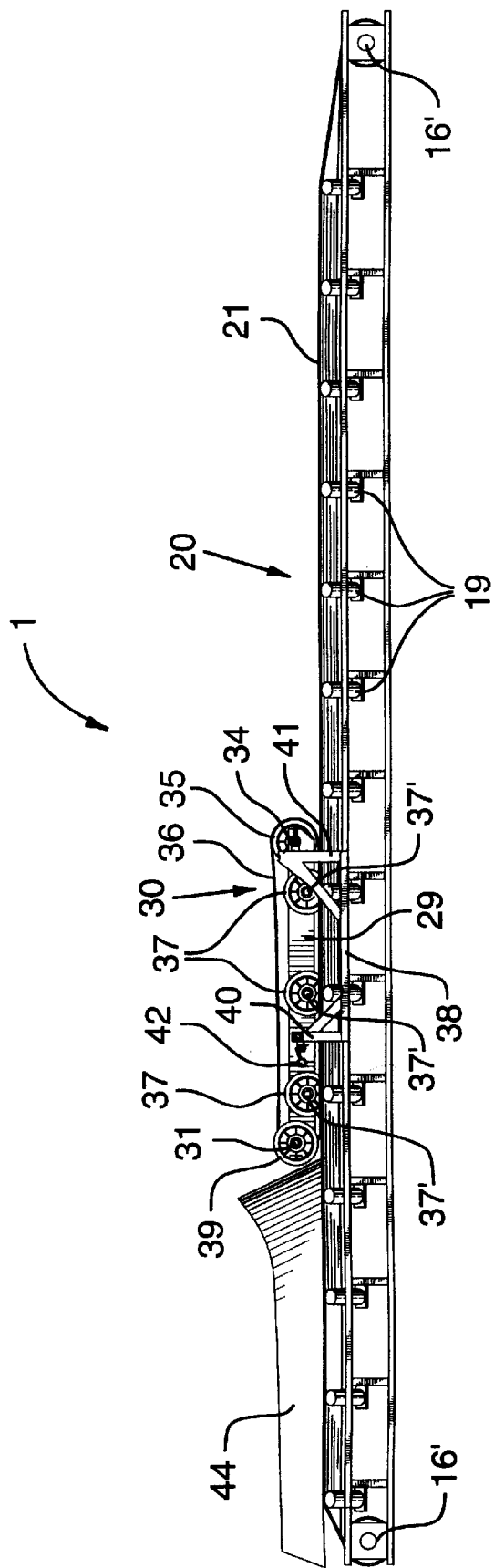
FIG. 1C is a side view of the second material transport means and the material hold down means according to the invention, showing the hold-down means in its lowered position.
Figure 2E:
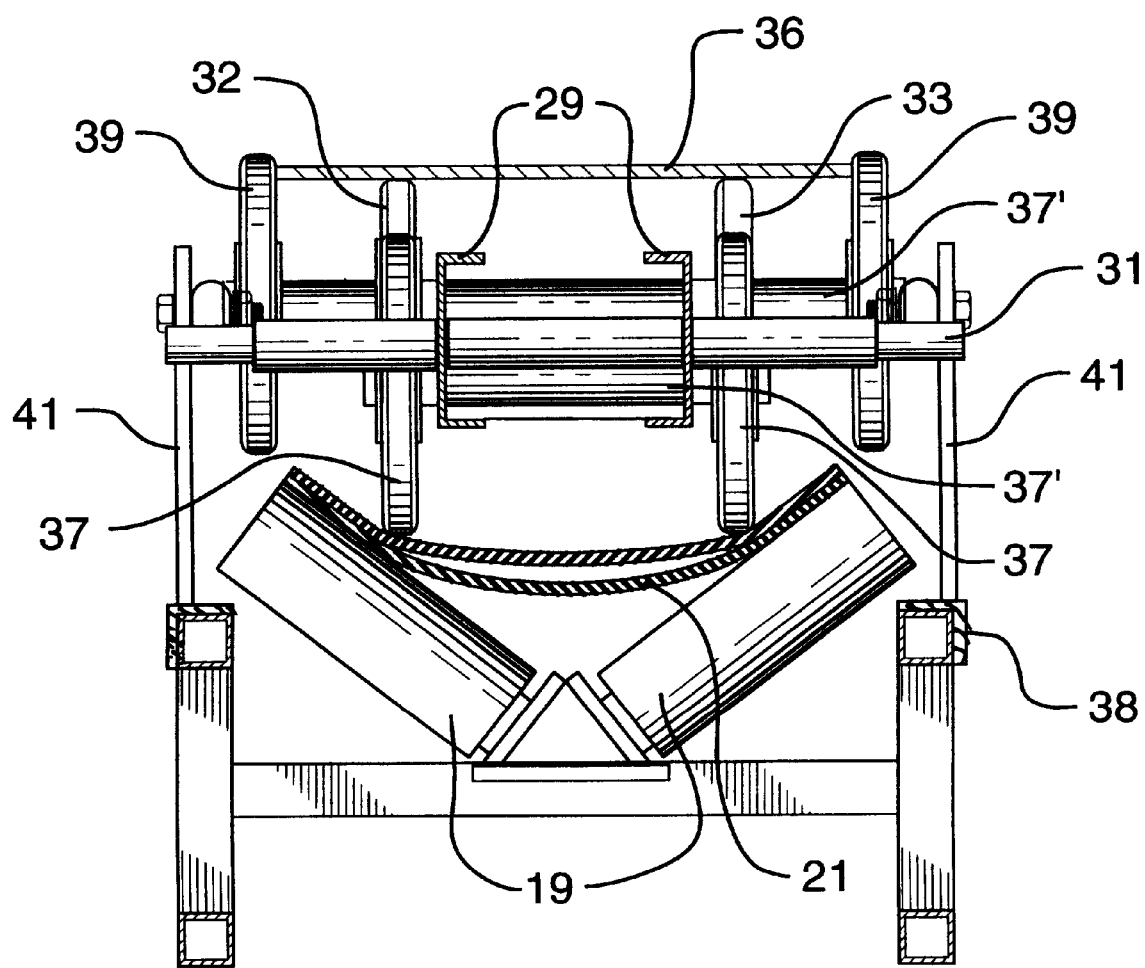
FIG. 2E is a sectional front view of the system according to FIG. 2D, along line C—C.
Figure 3A:
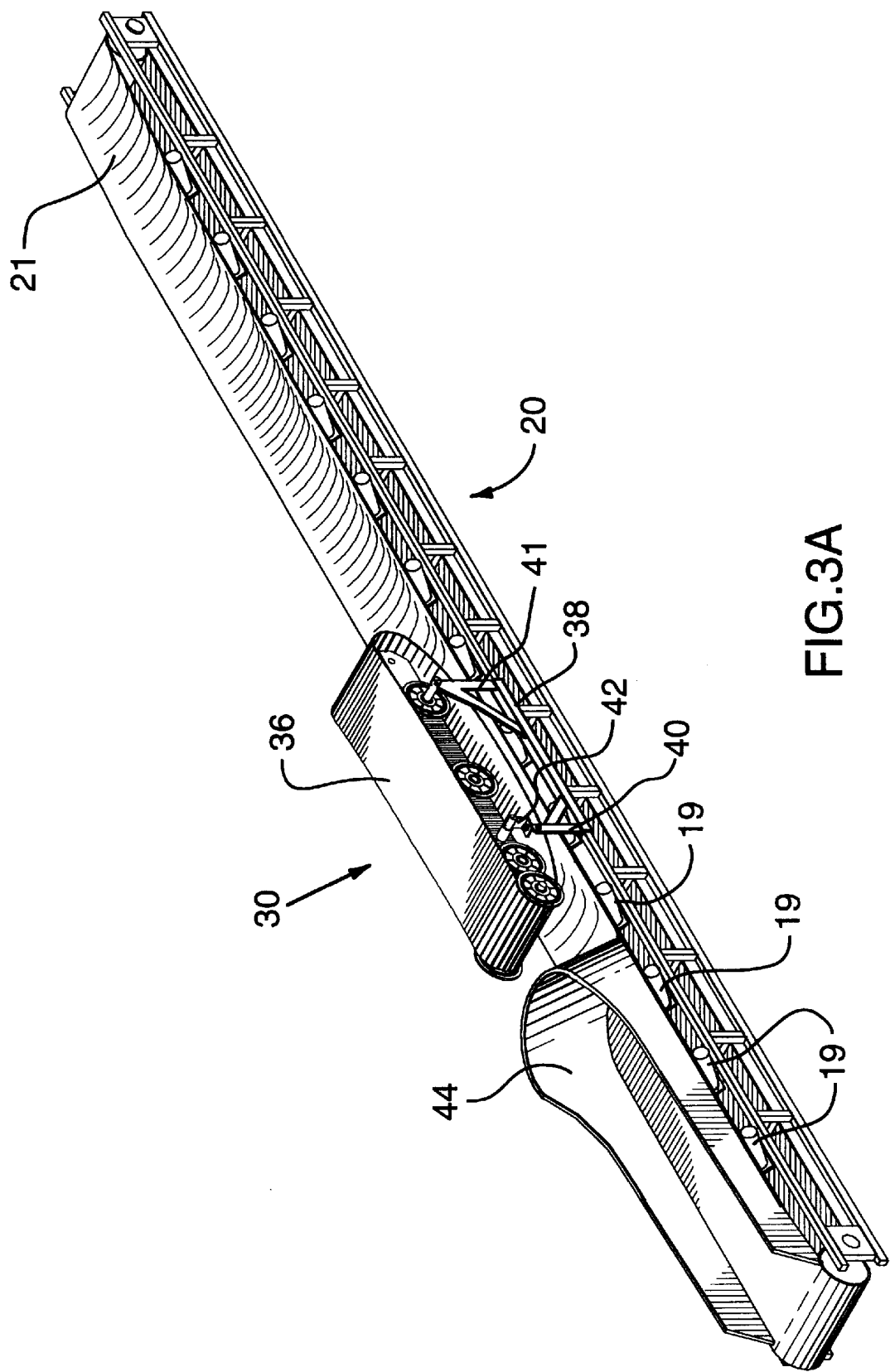
FIG. 3A is a perspective side view of a system according to the invention, showing the material hold-down means in its raised position.
Figure 3B:
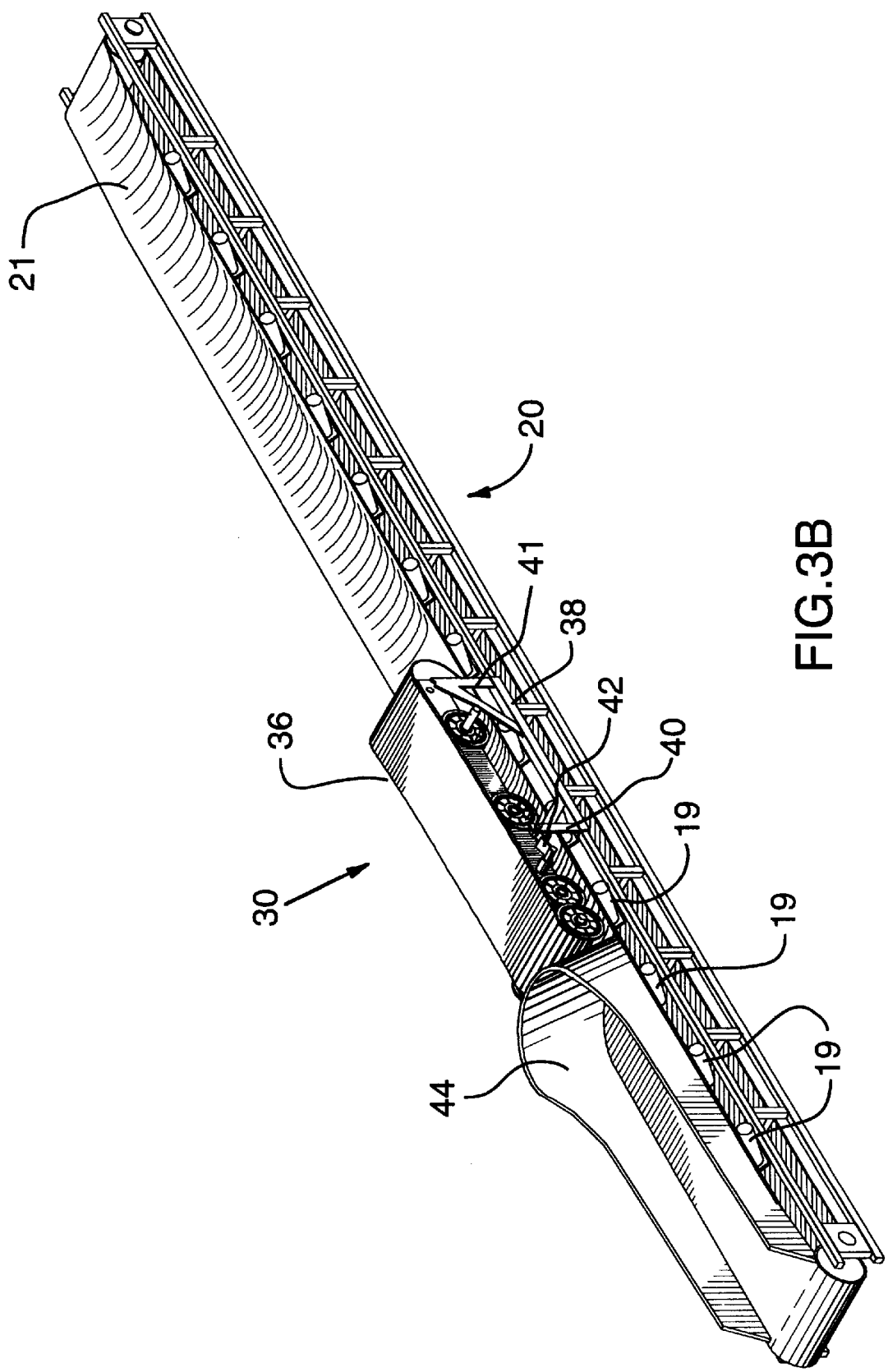
FIG. 3B is a perspective side view of a system according to the invention, showing the material hold-down means in its lowered position.

According to the invention and referring to FIGS. 1A to 1C, a system 1 for discharging material from a vehicle 10, comprises a material holding container 11 mounted on the vehicle, a plurality of material feeding means 12, such as hoppers, arranged at a lower part 13 of the container. Further, a first material transport means 14 is arranged to transport material from the plurality of feeding means, the first material transport means preferably comprises a first endless belt 15 running over a plurality of first rollers 16. The first endless belt preferably runs underneath and the complete length of the material holding container 11, and is arranged to receive discharged material from each of the plurality of material feeding means 12. The first endless belt has a first end 17, located adjacent the forward end of the material holding container 11, and a second end 18, located adjacent the rear of the material holding container. A second material transport means 20 is arranged to cooperate with the first material transport means 14.

As is shown in FIGS. 2A to 2E, the second material transport means preferably comprises a second endless belt 21 running over a plurality of second rollers 16', at least one of which is driven by a propulsion means (not shown), which may be regulated with respect to its speed. The second endless belt has a third end 22 and a fourth end 23, the third end being adjacent the second end 18 of the first endless belt 15, and the fourth end pointing in the direction of the desired material discharge. A material collector hood 44, situated on the second endless belt at its third end 22, may be used to catch material that is dropped from the first endless belt 15 onto the second endless belt 21. The second material transport means 14 further comprises a material hold-down means 30 arranged closer to, and frictionally engageable with, the third end 22 of the second endless belt 21. The material hold-down means is movable between two positions, one lowered position where the material hold-down means is in contact with and pressed against the second endless belt, and one raised position in which the material hold-down means is securely held at a distance above, and without touching, the second endless belt.

Figure 4A:
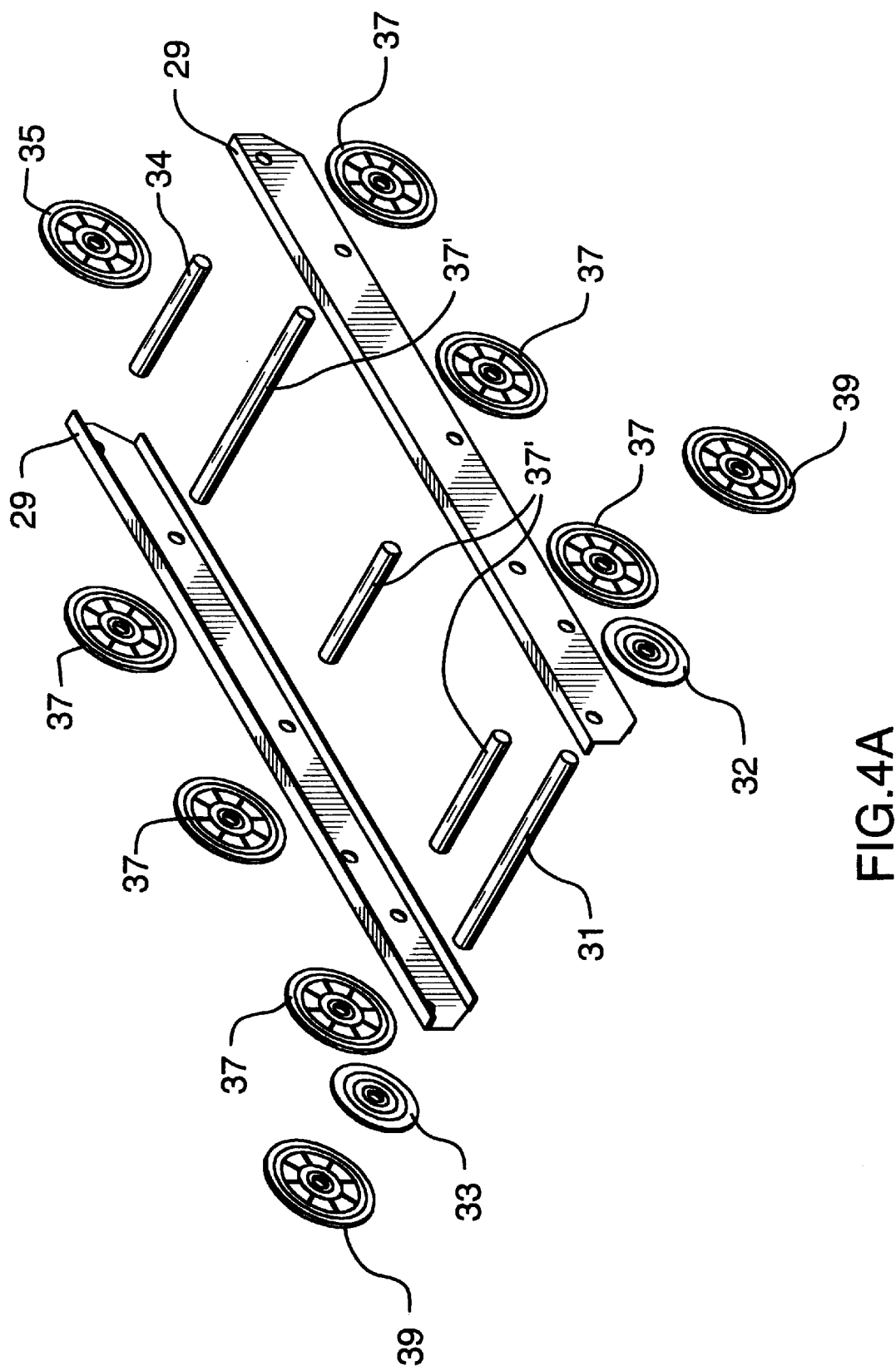
FIG. 4A is an exploded perspective elevational view of the frame and its associated axles and wheels according to the invention.
Figure 4B:
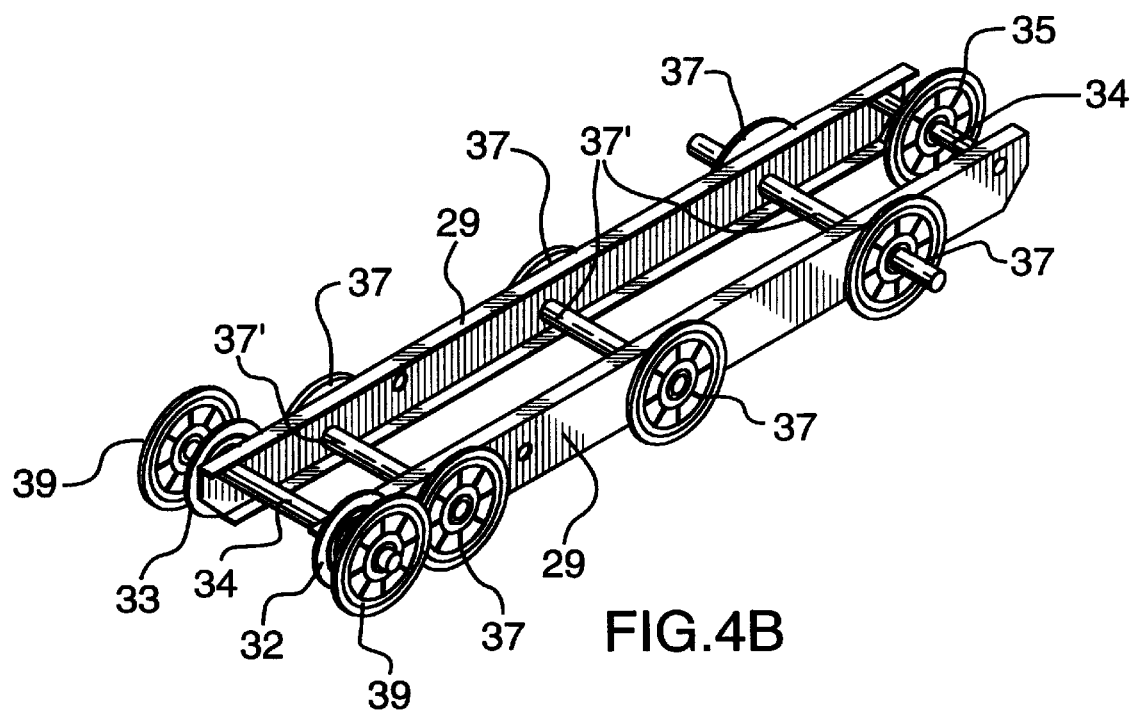
FIG. 4B is a perspective elevational view of the frame and its associated axles and wheels according to the invention.

As shown in detail in FIGS. 4A and 4B, the material hold-down means has a first wheel shaft 31 with a first wheel 32 and a second wheel 33, a second wheel shaft 34 with a third wheel 35 and a third endless belt 36 running from the first wheel shaft to the second wheel shaft and resting upon the first wheel, the second wheel and the third wheel. The first wheel shaft 31 and second wheel shaft 34 are connected by a frame means 29. The third wheel 35 is arranged substantially centred on the second wheel shaft 34 and the first wheel 32 and the second wheel 33 are substantially equidistant from the centre of the first wheel shaft 31. Referring back to FIGS. 2A to 3B, the third endless belt 36 is propelled by frictional forces between the second endless belt 21 and the third endless belt. The material hold-down means 30 is pressed downwards so that the bottom of the third endless belt is pressed against the top of the second endless belt 21, simultaneously the bottom of the third endless belt is pressed against a plurality of support wheels 37. The plurality of support wheels are arranged in pairs attached to each end of support wheel axles 37', and each support wheel axle is attached to the frame means 29 so that the plurality of support wheel axles are substantially parallel with each other and, preferably, also with the first wheel shaft 31 and the second wheel shaft 34. The distance between the individual support wheel axles 37' preferably corresponds to the distance between individual support rollers 19 arranged on the second material transport means 20 to support the second endless belt 21 in a bent funnel-shape. Thus, a pair of support rollers 19 are arranged with the respective longitudinal axis at an angle to each other, where the angle is preferably greater than 90 degrees but not greater than 180 degrees.

Figure 5:
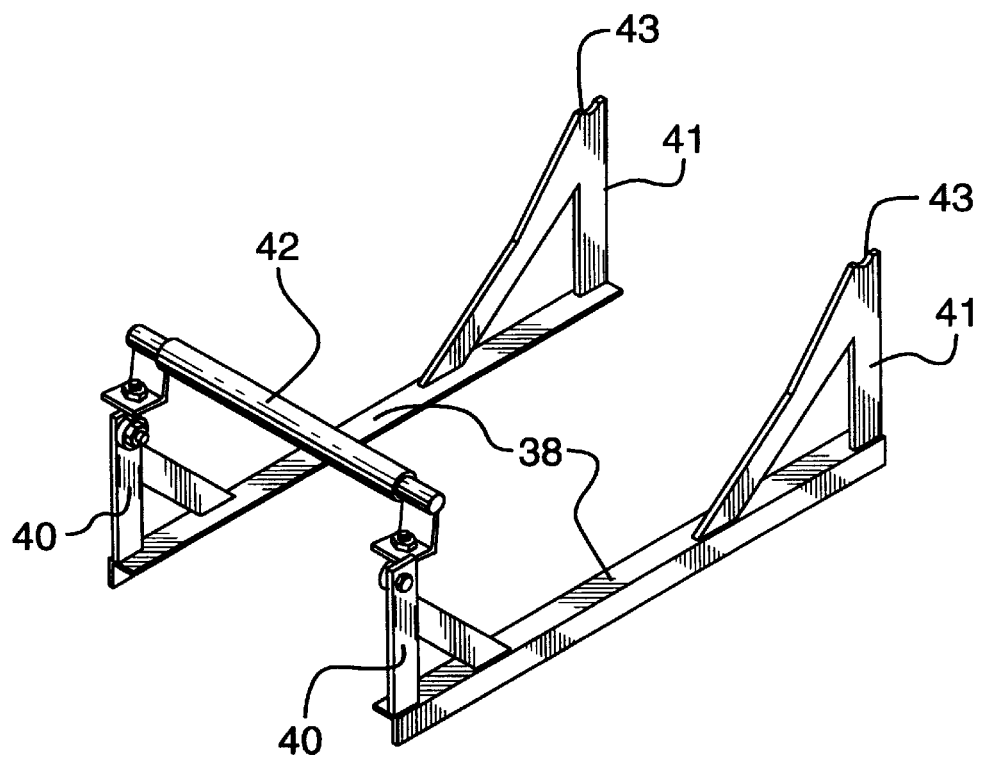
FIG. 5 is a perspective elevational view of the support for the hold-down means and its associated swivel means according to the invention.

As shown in detail in FIG. 5, the material hold-down means 30 is attached to a support 38, which is arranged to hold the material hold-down means in the raised position and to allow the material hold-down means to swivel down to its lowered position. The support has a forward part 40 and a rearward part 41. A swivel mechanism 42 is mounted on the forward part of the support and connects the support to the frame means 29, to guide and hold the material hold-down means in its lowered position, whilst a holding means 43 is arranged on the rearward part of the support, to hold the material hold-down means securely in its raised position.

The arrangement with three wheels holding the respective ends of the third endless belt 36 improves the tracking of the third endless belt, which is self-tracking on the first, second and third wheels, 32, 33 and 35, respectively, even if the first wheel shaft 31 and the second wheel shaft 34 are not longitudinally parallel to each other, i.e. out of alignment, i.e. the third endless belt stays centred on the three wheels even at higher speeds. In order to achieve the self-tracking properties of the third endless belt, the third wheel 35 has to be closest to the discharge end of the second endless belt 21, compared to the first and second wheels, 32 and 33 respectively. Outer wheels 39 are optionally arranged at the extreme outer ends of the first wheel shaft 31, so that the third endless belt 36 runs between the outer wheels and not on the outer circumference of the outer wheels.

The material emptied from the material holding container is propelled to a relatively low speed on the first endless belt 15. The second endless belt 21 is driven at a relatively high speed, to impart a high energy to the material to be discharged. In this way, the material may be deposited at a distance from the fourth end 23 of the second endless belt, making it unnecessary to place the vehicle close to the intended material deposit location. To hold the material securely on the second endless belt 21, until the material reaches the desired velocity, the material hold-down means 30 is arranged to press the material onto the second endless belt. This prevents the material from being scattered from the endless belt prematurely, thus improving both the efficiency of the system as well as the environmental safety of the operator of the system and anyone in the vicinity of the system. The material being discharged from the second endless belt 21 can be accurately placed at the desired remote location from the system by throwing the material a certain distance from the discharge end (the fourth end 23) of the second endless belt.

It should be clearly understood that it is not intended that the invention be limited to the specific preferred embodiments described above. Thus there will be many variations which will be apparent to those who are knowledgeable in the field, and such variations are considered to be within the scope of the invention as defined by the following claims.

What is claimed as the invention is:

1. A system for discharging material from a vehicle, said system comprising
    a material holding container mounted on said vehicle,
    a first material transport means, arranged under said material holding container, to transport material from said material holding container, said first material transport means being propelled by a first propulsion means,
    a second material transport means, arranged adjacent said first material transport means and comprising a conveyor having a second endless belt with an upper surface to receive material from said first material transport means and to deliver material from said first material transport means to a desired location remote from said vehicle, said second endless belt being propelled by a second propulsion means,
    a material hold-down means arranged and held on said second material transport means by supports, movable between a raised position and a lowered position by being manipulated by at least one swivel arm, to bias material securely onto said upper belt surface of said second material transport means, in the lowered position, until the material has been accelerated up to a travel speed of said second material transport means, wherein said material hold-down means has a first wheel shaft with a first wheel and a second wheel, a second wheel shaft with a third wheel and a third endless belt running from said first wheel shaft to said second wheel shaft and resting upon said first wheel, said second wheel and said third wheel, said first and second wheel shafts being mounted on a frame means, and where said third wheel is arranged substantially centred on said second wheel shaft and said first wheel and said second wheel are substantially equidistant from the centre of said first wheel, shaft, said frame means being securely mountable on said second material transport means and said at least one swivel arm pivotably connected at one end of said at least one swivel arm to said support and at an opposite end of said at least one swivel arm to said frame means of the material hold down means so that, when said material hold-down means is in said lowered position, said third endless belt of said material hold-down means is propelled by frictional forces between said third endless belt and said second endless belt of said second material transport means, so that said third endless belt tends to be self-tracking when it is propelled by said second endless belt of said second material transport means.

2. A system according to claim 1, wherein said first material transport means comprises a low speed first endless belt running over a plurality of first rollers, said first endless belt having a first end, located adjacent said material holding container, and a second end, located away from said material holding container.

3. A system according to claim 2, wherein said second endless belt has a third end, located adjacent said second end of said first endless belt, and a fourth end, pointing in the direction of the desired material discharge.

4. A system according to claim 3, wherein said system further comprises a plurality of material feeding hoppers arranged at a lower part of said container, and said first material transport means is arranged to transport material from said plurality of material feeding hoppers.

5. A system according to claim 3, herein said material hold-down means is arranged above said second endless belt and in frictional contact with said second endless belt, said third endless belt being propelled by frictional forces between said second endless belt and said third endless belt.

6. A vehicle comprising a system for discharging material from a vehicle, said system comprising
    a material holding container mounted on said vehicle,
    a first material transport means, arranged under said material holding container, to transport material from said material holding container, said first material transport means being propelled by a first propulsion means,
    a second material transport means, arranged adjacent said first material transport means and comprising a conveyor having a second endless belt with an upper surface to receive material from said first material transport means and to deliver material from said first material transport means to a desired location remote from said vehicle, said second endless belt being propelled by a second propulsion means,
    a material hold-down means arranged and held on said second material transport means by supports, movable between a raised position and a lowered position by being manipulated by at least one swivel arm, to bias material securely onto said upper belt surface of said second material transport means, in the lowered position, until the material has been accelerated up to a travel speed of said second material transport means, wherein said material hold-down means has a first wheel shaft with a first wheel and a second wheel, a second wheel shaft with a third wheel and a third endless belt running from said first wheel shaft to said second wheel shaft and resting upon said first wheel, said second wheel and said third wheel, said first and second wheel shafts being mounted on a frame means, and where said third wheel is arranged substantially centred on said second wheel shaft and said first wheel and said second wheel are substantially equidistant from the centre of said first wheel shaft, said frame means being securely mountable on said second material transport means and said at least one swivel arm pivotably connected at one end of said at least one swivel arm to said support and at an opposite end of said at least one swivel arm to said frame means of the material hold down means so that, when said material hold-down means is in said lowered position, said third endless belt of said material hold-down means is propelled by frictional forces between said third endless belt and said second endless belt of said second material transport means, so that said third endless belt tends to be self-tracking when it is propelled by said second endless belt of said second material transport means.

* * * * *

UNITED STATES PATENT AND TRADEMARK OFFICE
CERTIFICATE OF CORRECTION

PATENT NO.    : 6,305,896 B1
DATED         : October 23, 2001
INVENTOR(S)   : Mark D. Szentimrey It is certified that error appears in the above-identified patent and that said Letters Patent is hereby corrected as shown below:

<u>Title page,</u>
Item [76], should read:

-- [76]  Inventor: Mark D. Szentimrey, RR 1, Branchton, Ontario (CA), N0B 1L0 --

Signed and Sealed this

Eighteenth Day of March, 2003

JAMES E. ROGAN
*Director of the United States Patent and Trademark Office*